(12) United States Patent
Ishimori

(10) Patent No.: US 6,688,091 B2
(45) Date of Patent: Feb. 10, 2004

(54) RIDING LAWN MOWER

(75) Inventor: Shoso Ishimori, Sakai (JP)

(73) Assignee: Kubota Corp., Osaka (JP)

( * ) Notice: Subject to any disclaimer, the term of this patent is extended or adjusted under 35 U.S.C. 154(b) by 29 days.

(21) Appl. No.: 10/074,698

(22) Filed: Feb. 12, 2002

(65) Prior Publication Data

US 2002/0124542 A1 Sep. 12, 2002

(30) Foreign Application Priority Data

Feb. 13, 2001 (JP) .......................... 2001-035476

(51) Int. Cl.$^7$ ............................................. A01D 34/70
(52) U.S. Cl. ........................................... 56/202; 56/17.5
(58) Field of Search ............................ 56/7, 200, 202, 56/203–205, 17.3, 17.5, 16.6, 16.8, 13.3

(56) References Cited

U.S. PATENT DOCUMENTS

| | | | |
|---|---|---|---|
| 3,716,977 A | * 2/1973 | Jackson ........................ 56/202 |
| 4,809,796 A | 3/1989 | Yamaoka et al. .......... 180/6.48 |
| 4,916,887 A | 4/1990 | Mullet et al. ................ 56/13.8 |
| 5,042,239 A | 8/1991 | Card .......................... 56/14.7 |
| 5,193,882 A | 3/1993 | Gamaldi ........................ 298/11 |
| 5,946,894 A | 9/1999 | Eavenson et al. ............. 56/16.7 |
| 6,000,202 A | 12/1999 | Laskowski ................... 56/14.9 |
| 6,012,273 A | * 1/2000 | Ogasawara et al. .......... 56/16.6 |
| 6,050,072 A | * 4/2000 | Chabrier et al. ............... 56/202 |
| 6,082,086 A | * 7/2000 | Togoshi et al. ................ 56/199 |
| 6,170,242 B1 | 1/2001 | Gordon ....................... 56/15.8 |
| 6,213,218 B1 | 4/2001 | Miller ......................... 172/19 |

FOREIGN PATENT DOCUMENTS

JP 2000270652 10/2000

\* cited by examiner

*Primary Examiner*—Robert E. Pezzuto
(74) *Attorney, Agent, or Firm*—Webb Ziesenheim Logsdon Orkin & Hanson, P.C.

(57) ABSTRACT

A riding lawn mower includes a front wheel unit (1), a rear wheel unit (2) having a left rear wheel (2a) and a right rear wheel (2b), a body frame (3) supported by the front wheel unit and rear wheel unit, a mower unit (10) disposed under the body frame between the front wheel unit and rear wheel unit, a driver's seat (5) disposed on the body frame to be above the mower unit, an engine (7) disposed rearwardly of the driver's seat, and a drive transmission mechanism (70) for transmitting drive from the engine to the rear wheel unit. The engine (7) is disposed between and substantially at a higher level than the left and right rear wheels (2a, 2b) to secure a utility space (100) extending longitudinally of the vehicle body between the left and right rear wheels.

15 Claims, 5 Drawing Sheets

RIDING LAWN MOWER

BACKGROUND OF THE INVENTION

1. Field of the Invention

This invention relates to a riding lawn mower including a front wheel unit, a rear wheel unit having a left rear wheel and a right rear wheel, a body frame supported by the front wheel unit and the rear wheel unit, a mower unit disposed under the body frame between the front wheel unit and the rear wheel unit, a driver's seat disposed on the body frame to be above the mower unit, an engine disposed rearwardly of the driver's seat, and a drive transmission mechanism for transmitting drive from the engine to the rear wheel unit.

1. Description of the Related Art

This type of lawn mower is known from Japanese Patent Laying-Open Publication 2000-270652, in which an engine is mounted rearwardly of rear axles and substantially level with the rear axles. This lawn mower has no bulky engine disposed forwardly of a driver's seat. The operator has good forward visibility to facilitate a grass cutting operation with little chance of leaving uncut patches. However, for rearwardly discharging grass clippings reaped by a mower unit toward a grass catcher connected to the rear of the vehicle body and collecting the grass clippings in the grass catcher, the presence of the engine in a space between and above the right and left rear wheels prevents a space of sufficient height there. Thus, a sufficiently large grass clippings discharge area cannot be secured. A duct must be provided laterally outwardly of the vehicle body for guiding the grass clippings from the mower unit to the grass catcher, which results in an enlargement of the vehicle body. In a lawn mower known from U.S. Pat. No. 5,946,894, an engine and a driver's seat are arranged substantially between front wheels and rear wheels, and a mower disposed below the driver's seat. This lawn mower also has the same drawback that the presence of the engine in a space between and above the right and left rear wheels prevents a space of sufficient height there. Further, the engine and the driver's seat arranged substantially between the front wheels and the rear wheels require an extended distance between the front wheels and the rear wheels. Thus, no consideration is made for this type of lawn mower to attach the grass catcher to the rear of the vehicle body as an addition.

SUMMARY OF THE INVENTION

The object of this invention is to provide a lawn mower for enabling full use of a space from the rear of a mower unit and between right and left rear wheels, and allowing a grass catcher to be connected to the rear of a vehicle body as necessary to collect grass clippings.

The above object is fulfilled, according to this invention, by a riding lawn mower comprising a front wheel unit, a rear wheel unit having a left rear wheel and a right rear wheel, a body frame supported by the front wheel unit and the rear wheel unit, a mower unit disposed under the body frame between the front wheel unit and the rear wheel unit, a driver's seat disposed on the body frame to be above the mower unit, an engine disposed rearwardly of the driver's seat, and a drive transmission mechanism for transmitting drive from the engine to the rear wheel unit, wherein the engine is disposed between and substantially at a higher level than the left and right rear wheels to secure a utility space extending longitudinally of the vehicle body between the left and right rear wheels.

In this construction, the engine is disposed above and between the left and right rear wheels. Thus, a sufficient space is secured for rearwardly throwing grass clippings cut by the mower unit. Such a space extending longitudinally of the vehicle body between the left and right rear wheels may be used for accommodating a duct that guides grass clippings cut by the mower unit rearwardly of the vehicle body. Moreover, a sufficiently reduced distance may be achieved between the front wheels and rear wheels. The reduced wheelbase, combined with the mower unit disposed substantially directly under the diver's seat, provides an advantage of allowing the driver easily to confirm cutting areas below, which facilitates a grass cutting operation.

To fulfill the above-noted object, another lawn mower according to this invention employs a body frame extending to a region rearwardly of the rear wheel unit, and a support bracket disposed in a rear end region of the body frame for supporting a grass catcher for collecting grass clippings cut by the mower unit. With this construction, that is with the engine protruding by a reduced length rearward and a grass catcher supported at the rear of the body frame for collecting grass clippings, the lawn mower may have a reduced total length even when the grass catcher is attached thereto.

The lawn mower equipped with a grass catcher attached to the rear of the vehicle body may advantageously include a duct extending through the space between the left and right rear wheels for transmitting grass clippings from the mower unit to the grass catcher. A duct of sufficient size may be disposed in the utility space of sufficient height formed between the left and right rear wheels for rearwardly guiding grass clippings cut by the mower unit. Such a duct may extend, for example, over a minimum distance without possibility of interference with other components.

In a preferred embodiment of the invention, the grass catcher is supported by the body frame substantially rearwardly of the engine for connection to an end of the duct, and a lift link mechanism for vertically moving the grass catcher is disposed so as to cover opposite sides of the engine. With this construction, the lift link mechanism does not increase the longitudinal size of the vehicle body. As an additional advantage, the lift link mechanism prevents obstacles such as trees from contacting the engine during an operational run of the lawn mower.

The grass catcher must be raised high when unloading grass clippings at a high level such as a truck bed. As a suitable construction for this purpose, it is proposed that the lift link mechanism include a pair of right and left props erected on the body frame substantially laterally and forwardly of the engine, and lift links extending from upper positions of the props to the grass catcher, respectively.

Generally, the mower unit is vertically movably attached to the body frame. To ensure power transmission to the input shaft of the mower unit from a cutting power transmission mechanism regardless of a vertical position of the mower unit, a transmission shaft with a universal joint is used as a transmission element from the cutting power transmission mechanism to the input shaft. To drive the mower unit in this way, the cutting power transmission mechanism may be disposed rearwardly of the mower unit. However, where the lawn mower has the engine above and between the left and right rear wheels, the engine is close to the mower unit, allowing a short distance between the cutting power transmission mechanism and the input shaft of the mower unit. This would require a large flexion angle of the universal joint, resulting in a low transmission efficiency.

This problem is solved, in one preferred embodiment of the invention, by a cutting power transmission mechanism for transmitting cutting power from the engine to the mower unit, which includes a first power takeoff shaft extending along the body frame to a position forwardly of the mower unit, and a second power takeoff shaft extending along the body frame forwardly of the mower unit to have one end thereof connected to the first power takeoff shaft and the other end connected to the mower unit. In this construction, the second power takeoff shaft is disposed in a region forwardly of the mower unit where the engine imposes no positional restriction at in the fore and aft direction. Thus, the second drive takeoff shaft may be made sufficiently long to diminish the flexion angle of the universal joint.

Further, in the preferred embodiment of the invention, the drive transmission mechanism includes left and right transmissions allocated to the left and right rear wheels, respectively, and a distributing device for distributing drive from the engine to the left and right transmissions. In this construction, left and right transmissions may be arranged in the regions of the left and right rear wheels to divide a space for accommodating the drive transmission mechanism. This is advantageous in terms of space-saving design.

Other features and advantages of this invention will be apparent from the following description of an embodiment to be taken with reference to the drawings.

DESCRIPTION OF THE PREFERRED EMBODIMENTS

Figure 1:
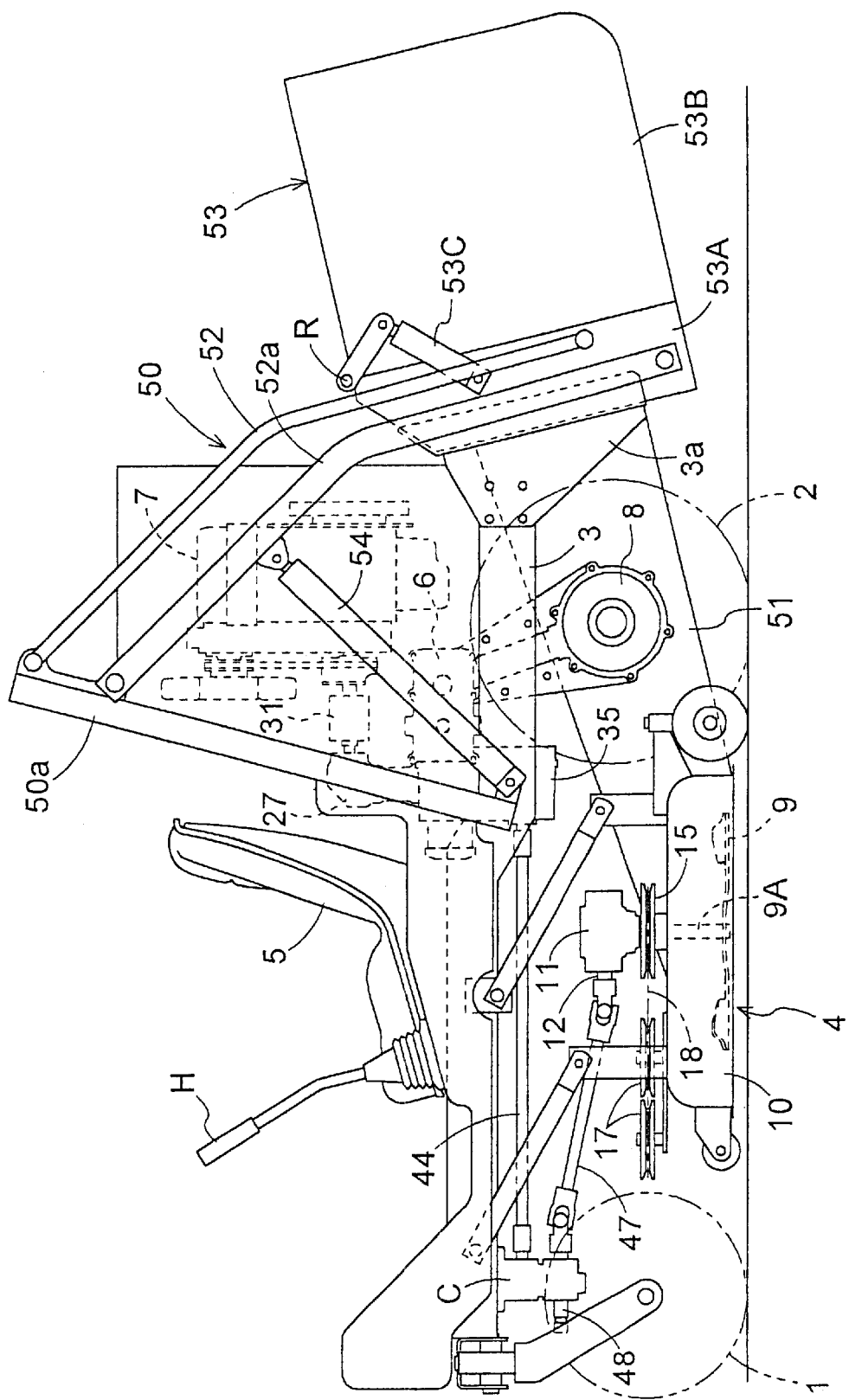
FIG. 1 is a side view of a lawn mower according to this invention.
Figure 2:
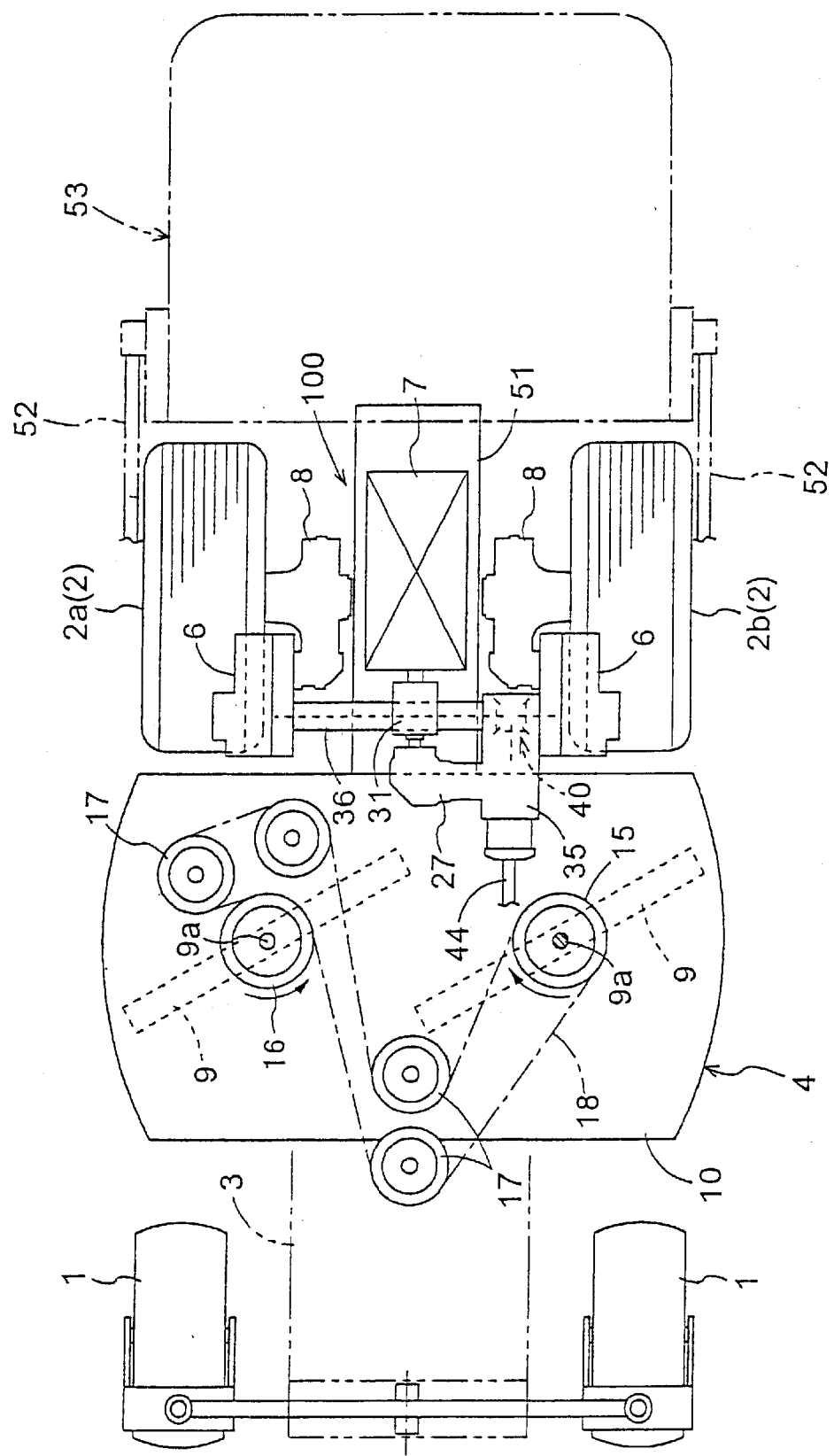
FIG. 2 is a plan view showing a chive transmission system of the lawn mower shown in FIG. 1.
Figure 3:
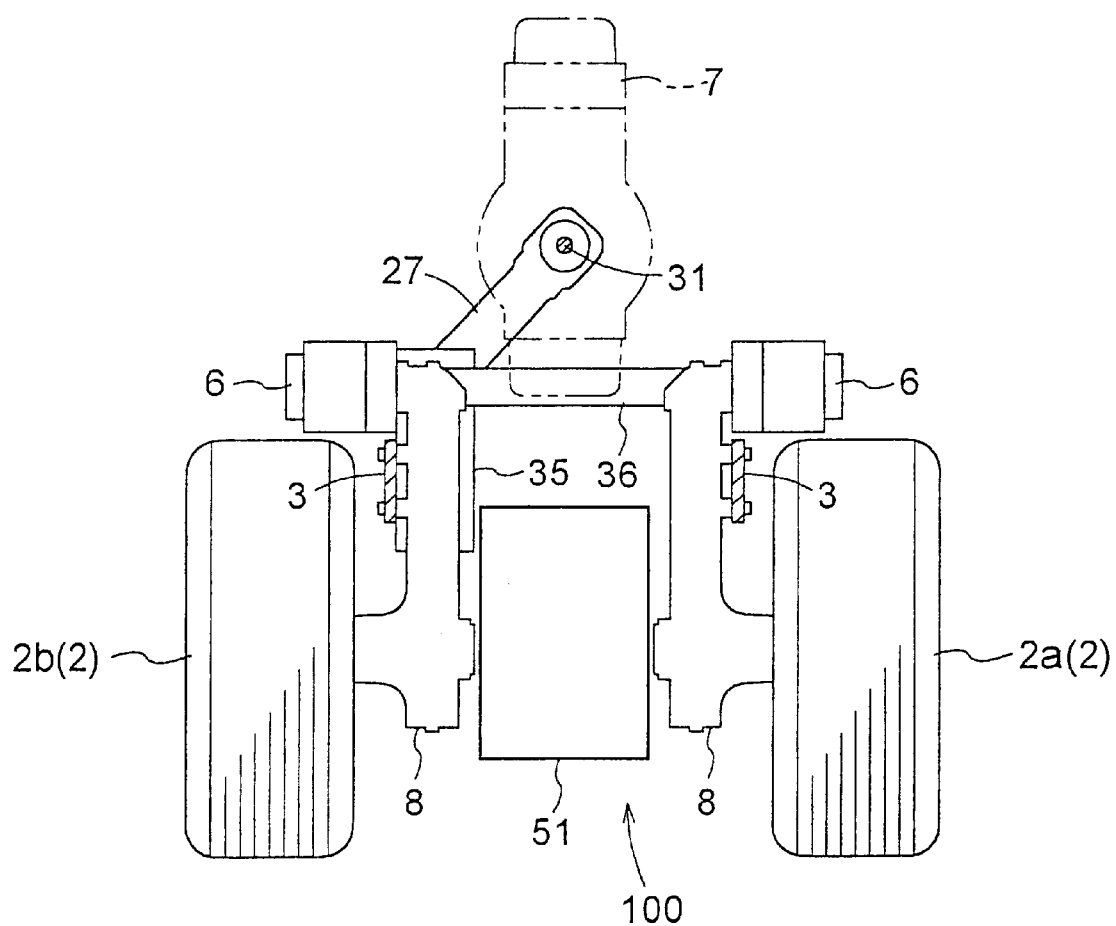
FIG. 3 is a rear view showing the drive transmission system of the lawn mower shown in FIG. 1.

As shown in FIGS. 1 through 4, a lawn mower includes a front wheel unit 1 having a pair of right and left caster type front wheels 1a and 1b, a rear wheel unit 2 having a pair of right and left rear drive wheels 2a and 2b, and a vehicle body frame 3 supported by the front wheel unit 1 and rear wheel unit 2. A mower unit 4 is vertically movably suspended from the body frame 3 between the front wheel unit 1 and rear wheel unit 2. A driver's seat 5 is disposed on the body frame 3 substantially over the mower unit 4. Hydrostatic stepless transmissions 6 switchable between forward and backward drive states are arranged in regions of the right and left rear drive wheels 2a and 2b to act as part of a drive transmission mechanism 70 for transmitting drive to the light and left rear drive wheels 2a and 2b. An engine 7 is disposed between and above the right and left rear drive wheels 2a and 2b. In this embodiment, the stepless transmissions 6 are disposed vertically intermediate between the engine 7 and rear wheel unit 2.

Each rear drive wheel 2a or 2b is journalled to a rear axle extending horizontally outwardly from a lower end of a rear axle case 8 mounted inwardly of the body frame 3 to extend vertically. As seen from FIG. 3, a utility space 100 is formed inwardly of the rear axle cases 8 extending upward inwardly of the rear drive wheels 2a and 2b. In this embodiment, a duct 51 extends longitudinally of the vehicle body through this space 100.

The mower unit 4 includes a pair of right and left grass cutting rotary blades 9 supported by a housing 10 acting also as a grass clipping scatter preventive cover, with rotating tracks of tips of the blades 9 partly overlapping each other. The blades 9 are rotated synchronously in directions to move rearward in the area of overlap to cut grass and discharge grass clippings rearward. As shown also in FIG. 5, a device for synchronously rotating the right and left blades 9 includes an input shaft 12 projecting forward from a gear case 11 disposed on the housing 10 of mower unit 4, a rotary shaft 9a of one of the blades 9 interlocked to the input shaft 12 through bevel gears 13 and 14, a pulley 15 mounted on the rotary shaft 9a to be rotatable together, a pulley 16 mounted on a rotary shaft 9a of the other blade 9 to be rotatable together, and a belt 18 toothed on both surfaces and extending by way of a plurality of guide pulleys 17 between and wound around the pulley 15 and pulley 16.

Figure 5:
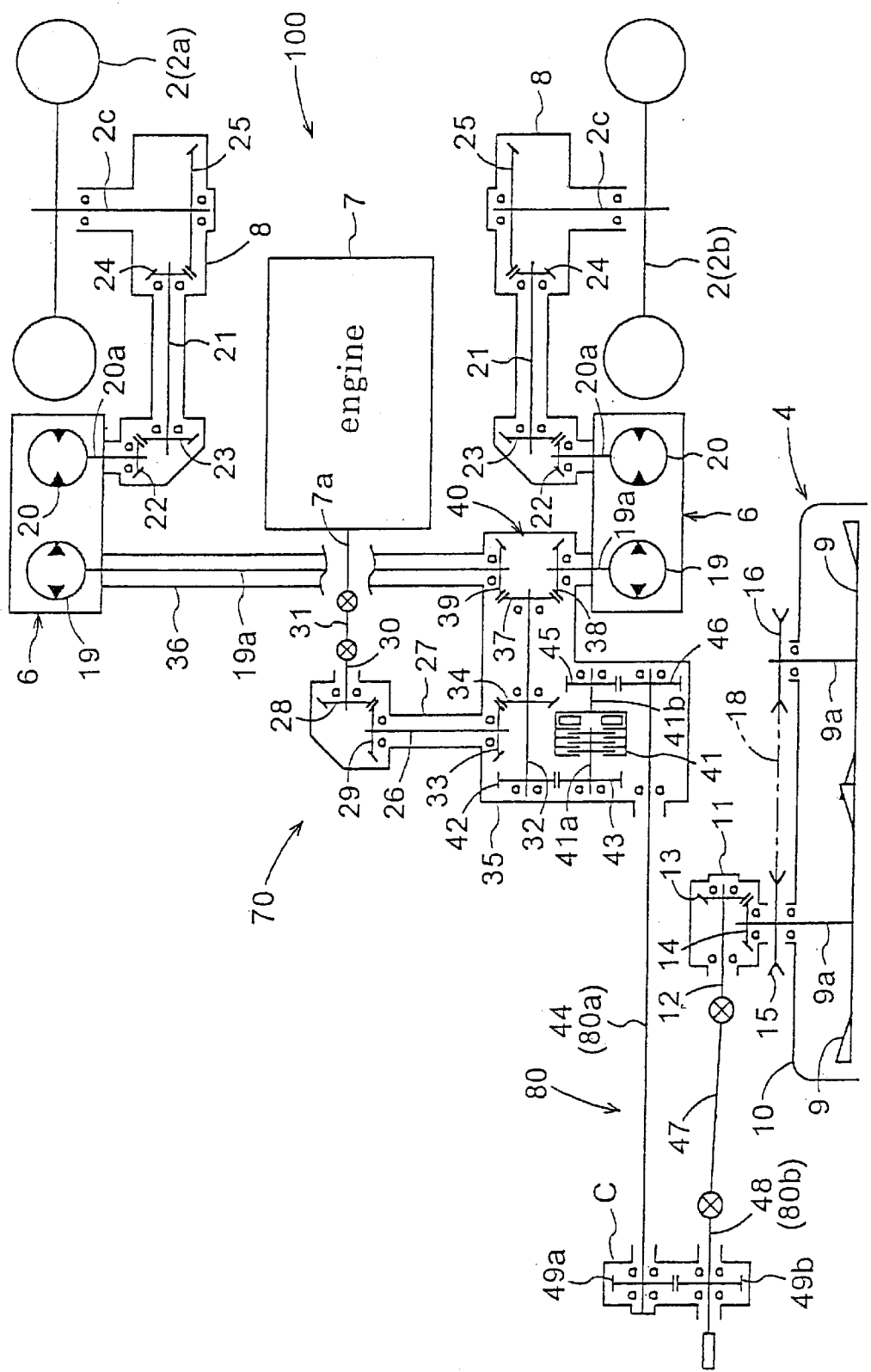
FIG. 5 is a diagram of the drive transmission system.

The transmissions 6 are arranged below the engine 7. As shown in FIG. 5, each transmission 6 is a swash plate type hydrostatic stepless transmission switchable between forward and backward drive states and having a pump 19 and a motor 20. Each rear axle case 8 houses a vertical transmission shaft 21 having an uppper end thereof interlocked to an output shaft 20a of the motor 20 through bevel gears 22 and 23, and a lower end interlocked to an axle 2c of rear drive wheel 2 through bevel gears 24 and 25, to transmit variable speed drive to the rear wheel 2. The lawn mower is driven straight by placing the two transmissions 6 in the same change speed state to rotate the rear wheels 2 at equal speed. When the two transmissions 6 are placed in different change speed states to rotate the rear wheels 2 at different rates, the lawn mower makes a turn with a rear wheel 2 rotating at the lower rate describing the inner track. Reference H in FIG. 1 denotes a pair of right and left shift levers for operating the transmissions 6 separately to control the lawn mower.

The drive from the engine 7 is distributed and transmitted to the two transmissions 6 through a distributing device 40 as shown in FIGS. 1–3 and 5. The distributing device 40 includes a transmission shaft 26 mounted in a transmission case 27 connected to a distributing case 35 attached to one of the transmissions 6. The distributing case 35 is connected to the other transmission 6 through an input case 36. The transmission shaft 26 is interlocked at an upper end thereof through bevel gears 28 and 29 to a case input shaft 30 interlocked through a ball joint 31 to an output shaft 7a of engine 7. The transmission shaft 26 is interlocked at a lower end thereof through bevel gears 33 and 34 to an intermediate transmission shaft 32 mounted in the distributing case 36 and extending in the fore and aft direction. The intermediate transmission shaft 32 is interlocked at a rear end thereof through the bevel gear 37, 38 and 39 to an input shaft 19a of the pump 19 in one transmission 6 and to an input shaft 19a of the pump 19 in the other transmission 6. Of course, the input shaft 19a of the pump 19 in the other transmission 6 is mounted in the input case 36. Thus, the distributing device 40, transmissions 6 and rear axle cases 8 constitute the drive transmission mechanism 70.

As shown in FIGS. 1 and 5, a cutting power transmission mechanism 80 for driving the mower unit 4 includes a power takeoff case C attached to a forward end of body frame 3 located forwardly of the mower unit 4. An input shaft 41a of a multidisk clutch 41 is interlocked to the forward end of intermediate transmission shaft 32 through gears 42 and 43. An output shaft 41b of multidisk clutch 41 is interlocked through gears 45 and 46 to a first power takeoff shaft 44 for transmitting drive to the power takeoff case C. The forward of first power takeoff shaft 44 is interlocked through gears 49a and 49b to a power takeoff intermediate shaft 48 rotatably supported in the power takeoff case C. The power takeoff intermediate shaft 48 is interlocked to the input shaft 12 through a second power takeoff shaft 47 and a universal joint. The power takeoff intermediate shaft 48 also extends forward for enabling forward power takeoff.

The first power takeoff shaft 44 extends forward along the body frame 3 to the power takeoff case C disposed at the forward end of body frame 3. The second power takeoff shaft 47 including the power takeoff intermediate shaft 48 extends from the power takeoff case C along the body frame 3 toward the gear case 11 of mower unit 4 disposed centrally of the vehicle body, over a length to provide an inclination not impairing the transmission efficiency of the universal joint.

Figure 4:
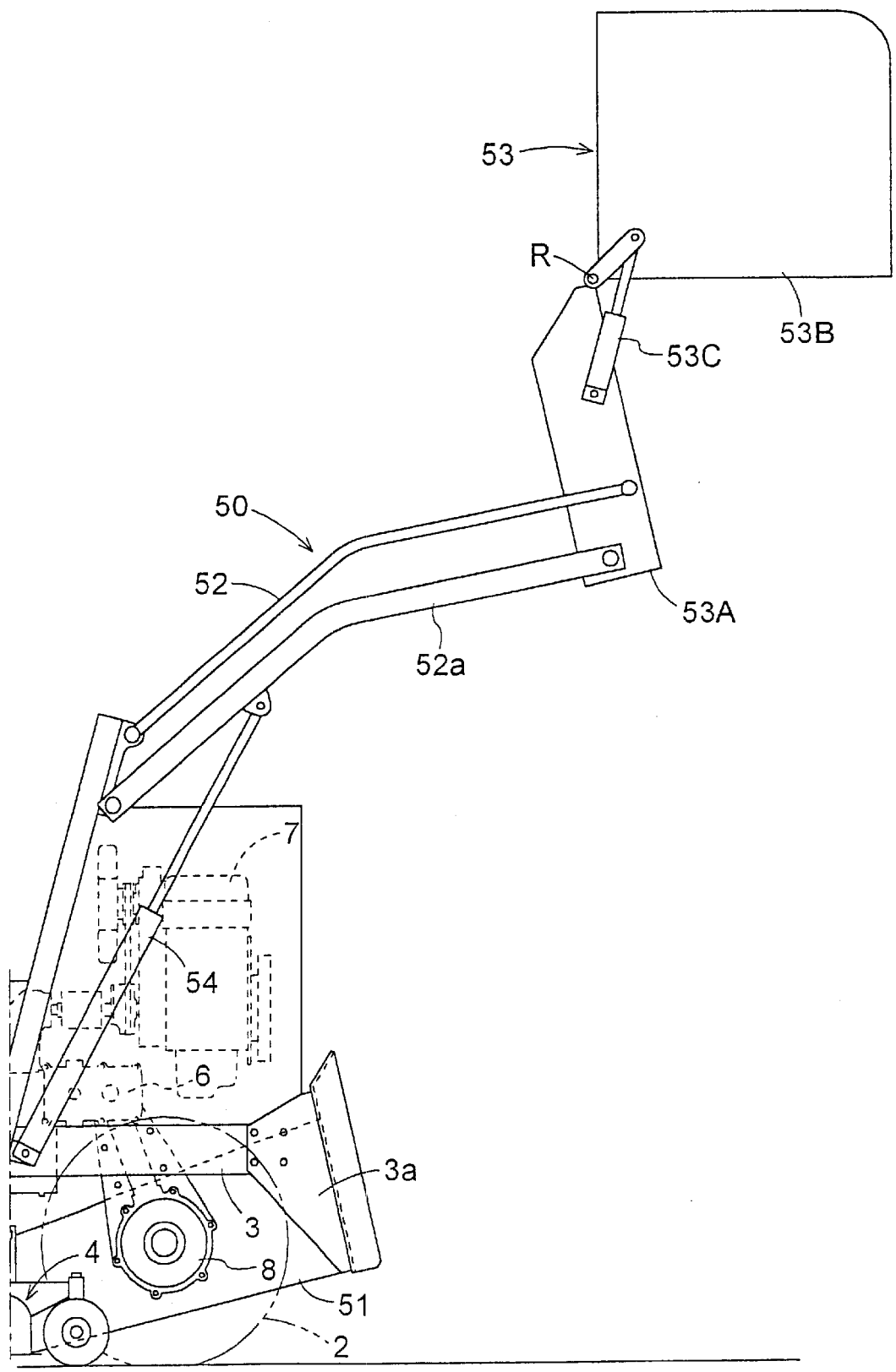
FIG. 4 is a side view showing a lift link mechanism with a grass catcher in a rasised position.

As noted hereinbefore, a utility space 100 is formed below the engine 7 and between the left and right rear drive wheels 2a and 2b to extend in the fore and aft direction. A duct 51 extends through this space 100 for rearwardly guiding grass clippings cut and rearwardly discharged by the mower unit 4. As shown in FIG. 4 also, a grass catcher 53 is connected to the rear of body frame 3 to be movable by a four-point link mechanism 50 between a collecting position for receiving grass clippings from the duct 51 and an upper discharge position.

The four-point link mechanisms 50 includes a pair of right and left props 50a fixed to the body frame 3 rearwardly of the driver's seat 5 and extending upward, and a pair of right and left lift links 52 each pivotally connected at one end thereof to the upper end of prop 50a and at the other end to a front frame 53A of grass catcher 53. The right and left lift links 52 and props 50a are arranged at opposite sides with the engine disposed in between. When the grass catcher 53 is maintained in the collecting position, that is when the mower is running, the lift links 52 extend along entire sides of a hood covering the engine 7. The relatively solid lift links 52 protect the relatively soft hood, and thus engine 7, from obstacles which could collide therewith during a run.

The grass catcher 53 is connected to the duct 51 when in the collecting position, and is disconnected therefrom when raised to the discharge position. The grass catcher 53 includes a front frame 53A defining an opening for connection to the duct 51, a main container 53B swingable rearward about a fulcrum R provided by the upper end R of front frame 53A to switch to a discharging posture in which a front opening having been closed by the front frame 53A is directed downward, and a discharge cylinder 53C in the form of a hydraulic cylinder for swinging the main container 53B about the fulcrum R.

The rear end of duct 51 is fixed to the rear end of body frame 3, and acts also as a grass catcher support bracket 3a defining an inclined support surface for snugly receiving the front frame 53A of grass catcher 53.

The grass catcher 53 is movable upward by a lift cylinder 54 in the form of a hydraulic cylinder extending between a lower link 52a of four-point link mechanism 52 and the body frame 3. The lift cylinder 54, when pressre oil supplied thereto, raises the grass catcher 53 and, when the pressure oil is drained, allows the grass catcher 53 to descend by gravity.

What is claimed is:

1. A riding lawn mower comprising:
   a front wheel unit;
   a rear wheel unit having right and left rear wheels;
   a body frame supported by said front wheel unit and said rear wheel unit;
   a mower unit disposed under said body frame between said front wheel unit and said rear wheel unit;
   a driver's seat disposed on said body frame to be above said mower unit;
   an engine disposed between and substantially at a higher level than said left and right rear wheels; and
   a drive transmission mechanism for transmitting drive from said engine to said rear wheel unit, said drive transmission mechanism including:
   a distributing device bridged over said right and left rear wheels at a level between that of said engine and that of said right and left rear wheels for branching drive from said engine;
   right and left transmissions allocated at right and left ends of said distributing device, respectively, for receiving the engine drive branched from said distributing device; and
   right and left axle cases depending from said right and left transmissions down to inside faces of said right and left rear wheels for transmitting the engine drive from said right and left transmissions to said right and left rear wheels, respectively,
   wherein a utility space extending longitudinally of said vehicle body is secured below said distributing device and between said right and left rear axle cases.

2. A riding lawn mower as defined in claim 1, wherein a duct extends through said utility space for transporting grass clippings rearwardly from said mower unit.

3. A riding lawn mower as defined in claim 2, wherein a grass catcher is supported by said body frame substantially rearwardly of said engine for connection to an end of said duct.

4. A riding lawn mower as defined in claim 3, wherein a lift link mechanism for vertically moving said grass catcher is disposed so as to cover opposite sides of said engine.

5. A riding lawn mower as defined in claim 4, wherein said lift link mechanism includes a pair of right and left props erected on said body frame substantially laterally and forwardly of said engine, and lift links extending from upper positions of said props to said grass catcher, respectively.

6. A riding lawn mower as defined in claim 1, wherein a cutting power transmission mechanism for transmitting cutting power from said engine to said mower unit includes a first power takeoff shaft extending along said body frame to a position forwardly of said mower unit, and a second power takeoff shaft extending along said body frame forwardly of said mower unit to have one end thereof connected to said first power takeoff shaft and the other end connected to said mower unit.

7. A riding lawn mower as defined in claim 1, wherein said body frame includes right and left longitudinal frame members, said right and left rear axle cases having outer faces thereof fixed to said frame members at a lower level than that of said right and left transmissions, respectively.

8. A riding lawn mower comprising:
   a front wheel unit;
   a rear wheel unit having right and left rear wheels;
   a body frame supported by said front wheel unit and said rear wheel unit and extending to a region rearwardly of said rear wheel unit;
   a mower unit disposed under said body frame between said front wheel unit and said rear wheel unit;
   a driver's seat disposed on said body frame to be above said mower unit;
   an engine disposed between and substantially at a higher level than said left and right rear wheels;
   a drive transmission mechanism for transmitting drive from said engine to said rear wheel unit;

a duct for transporting grass clippings rearwardly from said mower unit, said duct having a rear end fixed to a rear end of said body frame:

a grass catcher connected to an end of said duct, said grass catcher having a front frame: and a support bracket disposed at the rear end of said duct, said support bracket defining an inclined support surface for snugly receiving the front frame of said grass catcher.

9. A riding lawn mower comprising:

a front wheel unit;

a rear wheel unit having right and left rear wheels;

a body frame supported by said front wheel unit and said rear wheel unit, said body frame including right and left longitudinal frame members;

a mower unit disposed under said body frame between said front wheel unit and said rear wheel unit;

a driver's seat disposed on said body frame to be above said mower unit;

an engine disposed between and substantially at a higher level than said left and right rear wheels; and a drive transmission mechanism for transmitting drive from said engine to said rear wheel unit, said drive transmission mechanism including:

right and left transmissions allocated above said right and left rear wheels, respectively, for receiving the engine drive; and right and left axle cases depending from said right and left transmissions down to inside faces of said right and left rear wheels for transmitting the engine drive from said right and left transmissions to said right and left rear wheels, respectively, wherein said right and left rear axle cases having outer faces thereof fixed to said frame members at a lower level than that of said right and left transmissions, respectively, and wherein a utility space extending longitudinally of said vehicle body is secured below said engine and between said right and left rear axle cases.

10. A riding lawn mower as defined in claim 9, wherein said drive transmission mechanism further includes a distributing device for branching the drive from said engine to said right and left transmissions, said distributing device being bridged over said right and left rear wheels at a level between that of said engine and that of said right and left rear wheels.

11. A riding lawn mower as defined in claim 10, wherein a duct extends through said utility space for transporting grass clippings rearwardly from said mower unit.

12. A riding lawn mower as defined in claim 11, wherein a grass catcher is supported by said body frame substantially rearwardly of said engine for connection to an end of said duct.

13. A riding lawn mower as defined in claim 12, wherein a lift link mechanism for vertically moving said grass catcher is disposed so as to cover opposite sides of said engine.

14. A riding lawn mower as defined in claim 13, wherein said lift link mechanism includes a pair of right and left props erected on said body frame substantially laterally and forwardly of said engine, and lift links extending from upper positions of said props to said grass catcher, respectively.

15. A riding lawn mower as defined in claim 9, wherein a cutting power transmission mechanism for transmitting cutting power from said engine to said mower unit includes a first power takeoff shaft extending along said body frame to a position forwardly of said mower unit, and a second power takeoff shaft extending along said body frame forwardly of said mower unit to have one end thereof connected to said first power takeoff shaft and the other end connected to said mower unit.

* * * * *